United States Patent
Staton et al.

(10) Patent No.: US 8,514,203 B2
(45) Date of Patent: Aug. 20, 2013

(54) FLEXIBLE CALIBRATION DEVICE FOR TOUCH SENSOR PANEL CALIBRATION

(75) Inventors: Kenneth Lawrence Staton, San Carlos, CA (US); Richard Wei Kwang Lim, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 646 days.

(21) Appl. No.: 12/239,630

(22) Filed: Sep. 26, 2008

(65) Prior Publication Data

US 2009/0273584 A1 Nov. 5, 2009

Related U.S. Application Data

(60) Provisional application No. 61/049,351, filed on Apr. 30, 2008.

(51) Int. Cl.
| | |
|---|---|
| G06F 3/041 | (2006.01) |
| G01D 7/00 | (2006.01) |
| H01L 23/58 | (2006.01) |
| G01R 35/00 | (2006.01) |
| H04B 17/00 | (2006.01) |

(52) U.S. Cl.
USPC ........ 345/178; 73/862.046; 257/48; 324/601; 367/13

(58) Field of Classification Search
None
See application file for complete search history.

(56) References Cited

U.S. PATENT DOCUMENTS

| | | | | |
|---|---|---|---|---|
| 2,897,650 | A | * | 8/1959 | Carlson, Jr. et al. ............ 60/326 |
| 5,373,747 | A | * | 12/1994 | Ogawa et al. ............ 73/862.581 |
| 5,483,261 | A | | 1/1996 | Yasutake |
| 5,488,204 | A | | 1/1996 | Mead et al. |
| 5,825,352 | A | | 10/1998 | Bisset et al. |
| 5,835,079 | A | | 11/1998 | Shieh |
| 5,880,411 | A | | 3/1999 | Gillespie et al. |
| 6,188,391 | B1 | | 2/2001 | Seely et al. |
| 6,310,610 | B1 | | 10/2001 | Beaton et al. |
| 6,323,846 | B1 | | 11/2001 | Westerman et al. |
| 6,690,387 | B2 | | 2/2004 | Zimmerman et al. |
| 7,015,894 | B2 | | 3/2006 | Morohoshi |
| 7,184,064 | B2 | | 2/2007 | Zimmerman et al. |
| 7,663,607 | B2 | | 2/2010 | Hotelling et al. |
| 2003/0214485 | A1 | * | 11/2003 | Roberts .......................... 345/173 |
| 2004/0078114 | A1 | * | 4/2004 | Cordell et al. ................. 700/258 |
| 2004/0109013 | A1 | * | 6/2004 | Goertz ........................... 345/702 |
| 2005/0263744 | A1 | * | 12/2005 | Kudoh et al. .................. 252/500 |
| 2006/0026521 | A1 | | 2/2006 | Hotelling et al. |
| 2006/0097991 | A1 | | 5/2006 | Hotelling et al. |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS iPhone (1st generation), http://en.wikipedia.org/wiki/Iphone_(original).*

(Continued)

*Primary Examiner* — Alexander S Beck
*Assistant Examiner* — Kirk Hermann
(74) *Attorney, Agent, or Firm* — Morrison & Foerster LLP (57) ABSTRACT

The efficient calibration of multi-touch sensor panels that have non-flat surfaces is disclosed. The calibration of the sensor panels can be accomplished using a calibration device with a flexible calibration surface. The flexible calibration surface is particularly well-suited for curved or other non-flat touch sensor panels, such as those that might be present on a mouse or other device designed to be grasped by a user's hand. The flexible apparatus can conform to the non-flat touch sensor panel and apply the equivalent of a conductive touch over most or all of the pixels.

29 Claims, 4 Drawing Sheets

(56) References Cited

U.S. PATENT DOCUMENTS

| | | |
|---|---|---|
| 2006/0197753 A1 | 9/2006 | Hotelling |
| 2008/0127739 A1* | 6/2008 | DeAngelis et al. ............. 73/718 |
| 2008/0158172 A1 | 7/2008 | Hotelling et al. |
| 2008/0180399 A1* | 7/2008 | Cheng ........................... 345/173 |
| 2008/0296073 A1* | 12/2008 | McDermid ................ 178/18.05 |
| 2009/0025987 A1* | 1/2009 | Perski et al. ............... 178/18.03 |
| 2009/0133508 A1* | 5/2009 | Johansson et al. ....... 73/862.046 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

FLEXIBLE CALIBRATION DEVICE FOR TOUCH SENSOR PANEL CALIBRATION

CROSS-REFERENCE TO RELATED APPLICATION

This application claims the benefit of U.S. Provisional Application Ser. No. 61/049,351, filed Apr. 30, 2008, the entire contents of which are incorporated herein by reference.

FIELD OF THE INVENTION

This relates to multi-touch sensor panels that utilize an array of capacitive sensors (pixels) to detect and localize touch events, and more particularly, to the efficient calibration of multi-touch sensor panels that have non-flat surfaces.

BACKGROUND OF THE INVENTION

Many types of input devices are presently available for performing operations in a computing system, such as buttons or keys, mice, trackballs, touch sensor panels, joysticks, touch screens and the like. Touch screens, in particular, are becoming increasingly popular because of their ease and versatility of operation as well as their declining price. Touch screens can include a touch sensor panel, which can be a clear panel with a touch-sensitive surface, and a display device that can be positioned behind the panel so that the touch-sensitive surface can substantially cover the viewable area of the display device. Touch screens can allow a user to perform various functions by touching the touch sensor panel using a finger, stylus or other object at a location dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Touch sensor panels can be formed from a matrix of drive lines and sense lines, with sensors (pixels) located where the drive and sense lines cross over each other while being separated by a dielectric material or, in embodiments wherein the drive and sense lines are formed on the same side of a substrate, where the drive and sense lines are adjacent to or near each other. Touch sensors can also be arranged in any number of dimensions and orientations, including diagonal, concentric circle, and three-dimensional and random orientations. In order to scan a touch sensor panel and compute an image of touch, one or more frequencies can be used to stimulate one or more drive lines of the touch sensor panel (with the other drive lines being held at a fixed potential), and charge amplifiers (a.k.a. sense amplifiers) coupled to the sense lines can be configured to detect the amount of charge being coupled onto the sense lines. The outputs of the sense amplifiers, representing pixel output values, can be used in calculations to determine an image of touch for the touch sensor panel. Touch sensor panels capable of detecting either single-touch events or multiple touch events and determining an image of touch are described in Applicant's co-pending U.S. application Ser. No. 11/649,998 entitled "Proximity and Multi-Touch Sensor Detection and Demodulation," filed on Jan. 3, 2007, the contents of which are incorporated by reference herein in their entirety for all purposes.

Before a touch sensor panel can be installed in a device, it is preferable to perform tests to calibrate the device and ensure that there are no drive lines shorted together or open, and that no sense lines are shorted together or open.

SUMMARY OF THE INVENTION

This relates to touch sensor panel calibration devices that utilize flexible surfaces to simulate touch events over most or all of the touch sensors in a touch sensor panel to enable calibration of the panel. The calibration device is particularly well-suited for curved or other non-flat touch sensor panels, such as those that might be present on a mouse or other device designed to be grasped by a user's hand. The flexible apparatus can conform to the non-flat touch sensor panel and apply the equivalent of a conductive touch over most or all of the pixels.

The flexible surface of the calibration device may be molded into the shape of the touch sensor panel. By making the surface pliable, the surface is less susceptible to variations in the sensor surface. In some embodiments, the conducting material may have a resistivity of under 2 or 3 ohms per square.

Producing a curved or other non-linear continuous surface from some conducting pliable materials may be difficult. Accordingly, a spiral shaped calibration surface may be formed from a flat flexible material. When the spiral shape is applied to a curved touch sensor panel, the spiral shape collapses around the curved touch sensor panel surface. Further, the pliable material may spread out and may apply roughly the same amount of pressure across the surface of the touch sensor panel.

The spiral shaped pattern may be pressed down using a surface that has a contour that matches the contour of the touch sensor panel. The contoured surface that is used to press down on the spiral shaped pattern may be created from a material that is more easily shaped than the conductive rubber or other pliable material used to form the pliable spiral shaped pattern.

A contoured calibration surface may also be covered in protruding teeth made out of a pliable conductive material such as conducting rubber material. When the contoured surface is pressed down onto the surface of a sensor touch sensor panel, the pliable conductive material may spread out and apply roughly the same amount of pressure across most or the entire surface of the touch sensor panel. The teeth may be located close enough to one another such that when pressure is applied and the teeth spread out, gaps between the teeth are eliminated or minimized.

A flexible container filled with a fluid may also be used as a calibration surface. A flexible container, such as a fluid filled polymer bag, may be located in a well and connected to ground. A curved sensor or non-linear touch sensor panel attached, for example, by a suction device may then be pressed down onto the container. The suction device may also provide electrical connections for operating the touch sensor panel, or in other embodiments, one or more separate connectors may provide the electrical connections for operating the touch sensor panel. The touch events provided by the flexible container on the touch sensor panel can then be measured.

The container may be located in a well or otherwise surrounded to prevent the fluid, gel, or particles from escaping the testing area and damaging other components if the container ruptures.

DETAILED DESCRIPTION OF THE PREFERRED EMBODIMENTS

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

This relates to a flexible apparatus capable of simulating touch events over most or all of the touch sensors in a touch sensor panel to enable calibration of the panel. The flexible apparatus is particularly well-suited for curved or other non-flat touch sensor panels, such as those that might be present on a mouse or other device designed to be grasped by a user's hand. The flexible apparatus can conform to the non-flat touch sensor panel and apply the equivalent of a conductive touch over most or all of the pixels.

Figure 1A:
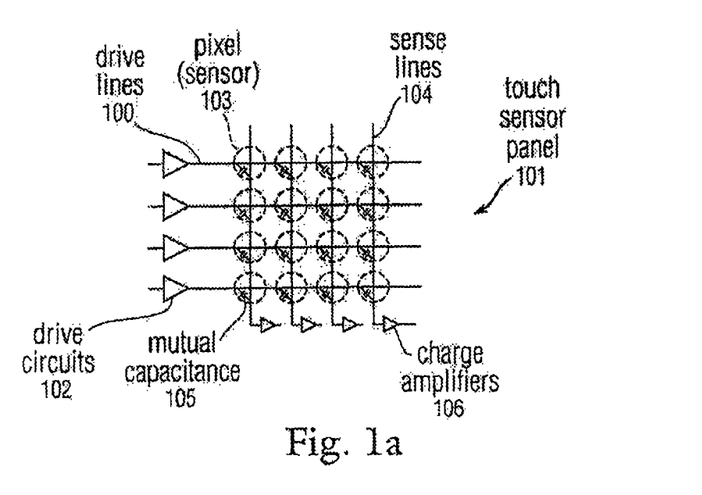
FIG. 1a illustrates an exemplary touch sensor panel having an array of sensors (pixels) formed from a plurality of drive lines and a plurality of sense lines.

FIG. 1a illustrates an exemplary touch sensor panel 101 having an array of sensors 103 that can be formed from a plurality of drive lines 100 and a plurality of sense lines 104. Drive lines (e.g. rows) 100 can be driven by stimulation signals from drive circuits 102. Because a mutual capacitance 105 can be formed between drive lines 100 and sense lines 104 (e.g. columns) at their crossing points (in dual layer embodiments where they are separated from each other by a dielectric), or where they are in close proximity to each other (in single-layer embodiments), charge from the drive lines can be coupled onto the sense lines, where charge amplifiers 106 detect the charge and generate pixel output values indicative of the amount of touch detected at a particular pixel. In general, the larger the pixel output value, the more touch was detected.

Figure 1B:
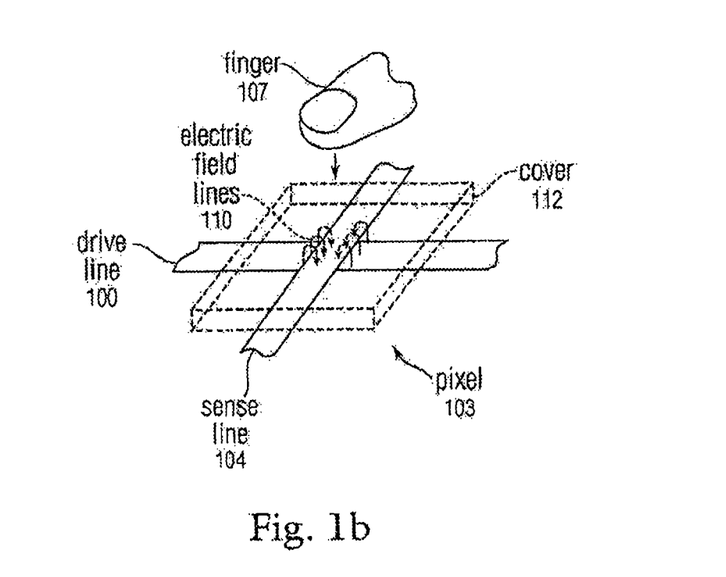
FIG. 1b illustrates a close-up of a single exemplary pixel formed from a drive line and a sense line and a finger touching down over the pixel.

FIG. 1b illustrates a close-up of a single exemplary sensor (a.k.a. electrode or pixel) 103 formed from drive line 100 and sense line 104 and finger 107 touching down over pixel 103. Fringing electric field lines can be formed between drive line 100 and sense line 104. Some electric field lines 110 can extend above cover 112, which is located above the sensor array. When finger 107 or other object touches down over pixel 103, the finger blocks some of the electric field lines 110 extending above cover 112, and thus affects the charge coupled onto sense line 104.

Figure 2A:
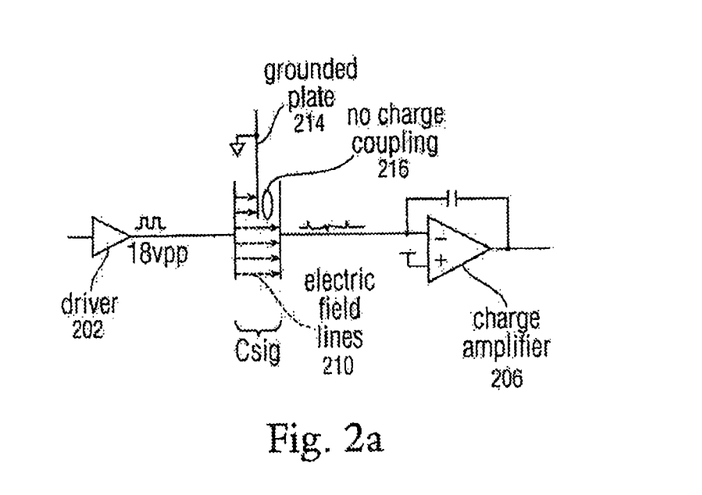
FIG. 2a illustrates an exemplary equivalent electrical circuit corresponding to FIG. 1b in which the finger is grounded to a device that includes the touch sensor panel.

FIG. 2a illustrates an exemplary equivalent electrical circuit corresponding to FIG. 1b in which the finger is grounded by touching a bezel, backside, etc. of a device that includes the touch sensor panel. In FIG. 2a, driver 202 can apply a stimulation signal (e.g. an 18 Vpp signal) across mutual capacitance Csig formed by the pixel, and charge amplifier 206 can detect the charge coupled across Csig. In FIG. 2a, because the finger is grounded, the finger can be represented conceptually as grounded plate 214 being inserted between the parallel plates of Csig, with the left plate representing the drive line and the right plate representing the sense line. Grounded plate 214 can block some of the electric field lines 210 flowing from the left plate to the right plate. Because blocked electric field lines 210 can be shunted to ground through the grounded finger, virtually no charge is coupled through to the sense column (see 216) for the blocked electric field lines 210.

Figure 2B:
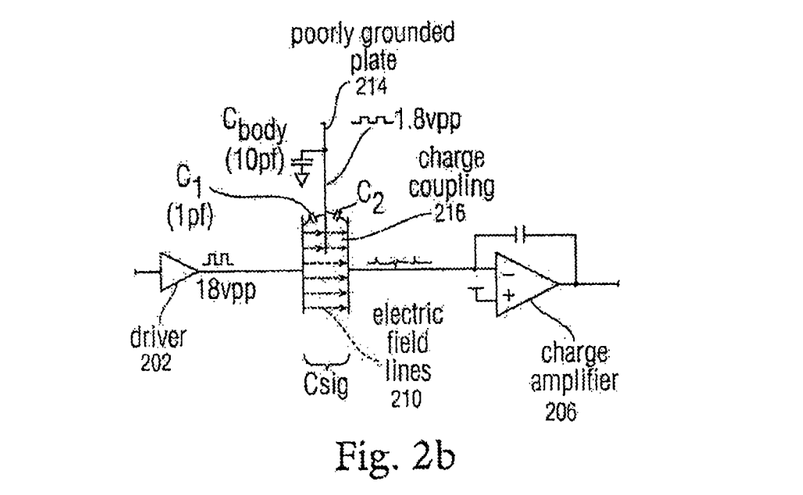
FIG. 2b illustrates an exemplary equivalent electrical circuit corresponding to FIG. 1b in which the finger is floating or otherwise not grounded to the device that includes the touch sensor panel.

FIG. 2b illustrates an exemplary equivalent electrical circuit corresponding to FIG. 1b in which the finger is floating, isolated or otherwise not grounded or poorly grounded (referred to herein as "substantially ungrounded") to the bezel, backside, etc. of the device that includes the touch sensor panel (as might occur if the user touched the touch sensor panel surface without picking up the device). In this situation, the finger can be capacitively coupled to the device through a capacitance Cbody of about 10-100 pF, which is a function of the area of the person and the area of the device. Furthermore, if the device is connected to a docking station, for example, this also increases the effective area of the device and therefore changes the capacitance. In FIG. 2b, driver 202 can apply a stimulation signal (e.g. an 18 Vpp signal) across mutual capacitance Csig formed by the pixel, and charge amplifier 206 can detect the charge coupled across Csig. In FIG. 2b, because the finger is isolated, the finger can be represented conceptually as a plate 214 being inserted between the parallel plates of Csig, with the left plate of Csig representing the drive line and the right plate representing the sense line. Because the finger is isolated, the plate has a capacitance Cbody to ground of about 10-100 pF. The capacitively coupled plate 214 forms a capacitance C1 with respect to the sense line and blocks some of the field lines 210, but instead of shunting the charge to ground, a capacitance C2 to the sense line is also formed. Thus, there is some charge coupling onto the sense line (see 216), and there is a small voltage signal coupled onto the finger. For example, if the stimulation signal is 18 Vpp and Cbody is 10 pF, about 1.8 Vpp can appear on the finger. The result of this charge coupling through the finger and onto the sense line is that the effect of a finger touch is reduced. The finger attenuates the amount of charge coupled onto the sense line, but some charge is still coupled through.

Figure 3:
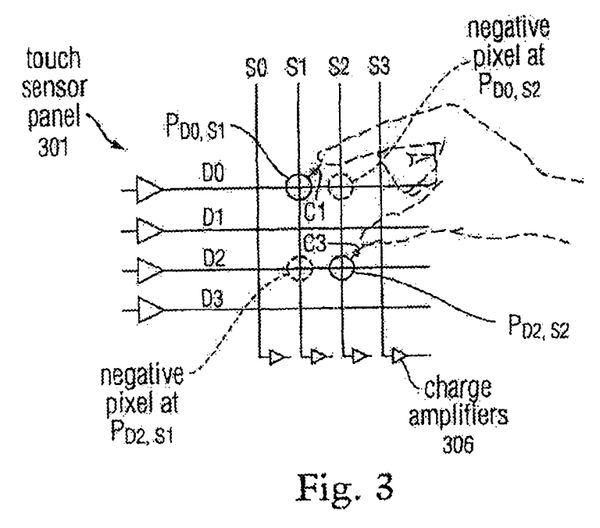
FIG. 3 illustrates an exemplary touch sensor panel experiencing two simultaneous touch events that produce a so-called "negative pixel" effect.

FIG. 3 illustrates an exemplary touch sensor panel 301 such as that shown in FIG. 1a, with drives lines identified as D0-D3 and sense lines identified as S0-S3. In the example of FIG. 3, two fingers have touched down over two different spots on the sensor panel, at the pixel intersected by D0 and S1 ($P_{D0,S1}$) and at the pixel intersected by D2 and S2 ($P_{D2,S2}$). Alternatively, the same effect can be generated by a substantially ungrounded conductor placed down diagonally on the touch sensor panel and covering $P_{D0,S1}$ and $P_{D2,S2}$.

In one example, if the fingers (or the conductor) are grounded as described above, most or all of electric field lines that exit the cover above both pixels are blocked, little or no charge is coupled through to the sense lines S1 and S2, and therefore there is little or no error in the measured touch output value S of the pixels. In other words, charge amplifiers 306 connected to each of the sense lines S0-S2 are able to fully detect to touch events. Furthermore, little or no error is introduced into the measured touch output value S of other adjacent pixels.

However, in another example, where the fingers (or conductor) are isolated (substantially ungrounded) and D0 is being stimulated, charge from $P_{D0,S1}$ is coupled onto the finger (or conductor) touching down over $P_{D0,S1}$, but rather than being shunted to ground an attenuated waveform appears on the finger (or conductor). The attenuated signal (and therefore some charge) is coupled back onto sense line S1, and is also coupled through the user's other finger (or the conductor) onto sense line S2. If the user (or conductor) was grounded, because D2 is not being stimulated, the finger (or conductor) over $P_{D2,S2}$ would not cause any charge to be coupled onto S2. However, because the fingers (or conductor) are poorly grounded in the present example, some signal and charge is in fact coupled onto S2. In other words, there is a capacitance C1 from the stimulated drive line D0 to one finger (or the conductor), and another capacitance C2 from another finger (or the conductor) to sense line S2, causing charge to be coupled onto S2. The net effect is to increase the charge coupling onto S2 as compared to the case when the user (or conductor) is grounded.

In FIG. 3, the effect of charge coupling back onto S1 and S2 will reduce the apparent touch detected at touch locations $P_{D0,S1}$ and $P_{D2,S2}$, based on the measured touch output values at those locations. In addition, this effect will increase the charge coupling and reduce the output indicative of a touch for pixels outside the touch locations, such as pixel $P_{D0,S2}$. For example, in a normal no-touch condition pixel $P_{D0,S2}$ may see 1.5 pF of mutual capacitance and a charge coupling Qsig of 27 pCpp, and in a grounded finger (or conductor) touch condition that same pixel may see 1.3 pF of mutual capacitance and a charge coupling of 24 pCpp. However, with charge coupling occurring across substantially ungrounded fingers (or across a substantially ungrounded conductor) as described above, the effect on adjacent untouched pixel $P_{D0,S2}$ can be to increase the charge coupling above the normal no-touch condition of 27 pCpp, to 29 pCpp, for example. This amount of charge coupling, when detected by charge amplifier 306, gives the appearance of a so-called "negative pixel" or a negative amount of touch at $P_{D0,S2}$. Pixel $P_{D2,S1}$ can also experience the same negative pixel effect. Note that a negative pixel, as used herein, can include pixels that appear to have a negative amount of touch based on their touch output value, and pixels that have a positive but artificially reduced amount of touch based on their touch output value.

Capacitive touch sensor panels, and particularly, multi-touch sensor panels, may be calibrated to provide more uniform signals (touch output values) when untouched and when touched. However, as described above, the uniformity of the detected touch can be affected by the conductivity of the object touching the touch sensor panel. Therefore, to accomplish this calibration, a conductive surface may be applied to the touch sensor panel to produce a number of consistent touch events throughout the touch sensor panel. The uniformity of the contact between the conductive surface and the touch sensor panel may impact the calibration.

As described above, a touch sensor panel can include a number of pixels formed from the drive and sense lines.

During calibration of the touch sensor panel, the drive lines may be stimulated with one or more frequencies, and the conductive surface can be applied to the panel to provide a uniform touch event to each one of the sensors in the touch sensor panel. In this manner, a touch output value can be obtained for every sensor in the touch sensor panel. Mathematical equations can then be used to calibrate the panel so that a touch anywhere on the panel will provide approximately the same touch output value.

In addition to being sensitive to whether there is a touch, a touch sensor panel may also be sensitive to how much pressure is applied by the touch. Pressure sensitivity can arise in mutual capacitance touch sensor panels for a number of reasons. For example, pressure sensitivity can arise because of the flexibility of adhesives used in producing a touch sensor panel, and the flexibility of the touch sensor panel itself. In addition, air gaps between the layers that make up the touch sensor panel can arise and should be avoided. Accordingly, it can be desirable to apply equal pressure to the touch sensor panel during calibration to reduce the effect of pressure sensitivity on the calibration of the touch sensor panel.

Calibration of a flat touch sensor panel may be accomplished, for example, using a flat conductive rubber pad to produce the touch events. These pads can be configured to be carefully aligned with the touch sensor panel and to apply equal pressure across the panel.

Although a flat conductive pad may work for applying a uniform conductive surface to a flat touch sensor panel, these pads may not work well for providing touch events for calibration when the touch sensor panel surface is not flat, for example a curved surface. Accordingly, methods and apparatus for efficiently calibrating non-flat touch sensitive surfaces are provided.

One method of calibrating a non-linear touch sensor panel is to mold the conductive calibration tool into the shape of the touch sensor panel. The conducting surface of the calibration tool may be made from conducting rubber or other pliable conducting material. By making the surface pliable, the surface is less susceptible to variations in the sensor surface. In some embodiments, the conducting material may have a resistivity of under 2 or 3 ohms per square.

Figure 4:
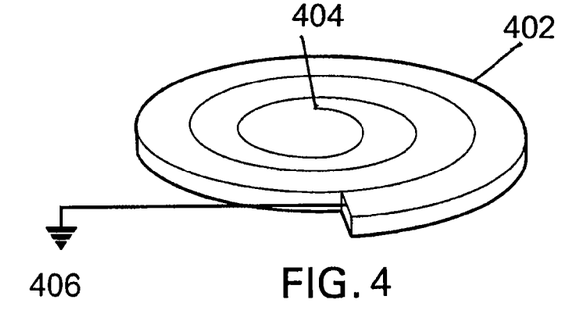
FIG. 4 illustrates an exemplary calibration tool in which a pliable material, such as conducting rubber material, is formed into a spiral pattern according to embodiments of the invention.

However, producing a curved or other non-linear continuous surface from conducting pliable materials may be difficult. Accordingly, FIG. 4 illustrates an exemplary calibration tool in which a pliable material 402, such as conducting rubber material, is formed into a spiral pattern according to embodiments of the invention.

When the center portion 404 of this spiral is raised up, a curved cone shaped surface may be created. This cone shaped surface may then be uniformly set down or pressed down onto a curved touch sensor panel. This can cause the cone to collapse until each part of the spiral comes into contact with the touch sensor panel. Further, the pliable material may spread out and may apply roughly the same amount of pressure across the surface of the touch sensor panel.

The spiral shaped pattern may be pressed down using a surface that has a contour that matches the contour of the touch sensor panel. The contoured surface that is used to press down on the spiral shaped pattern may be created from a material that is more easily shaped than the conductive rubber or other pliable material used to form the pliable spiral shaped pattern. The pliable conducting surface can connected to ground 404 at the time of calibration.

Figure 5:
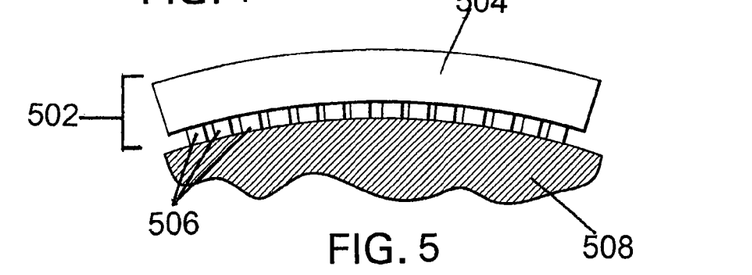
FIG. 5 illustrates an exemplary calibration tool that includes a contoured surface that has been covered in teeth made out of a pliable conductive material, such as conducting rubber material according to embodiments of the invention.

FIG. 5 illustrates an exemplary calibration tool 502 that includes a contoured surface 504 that has been covered in protruding teeth 506 made out of a pliable conductive material such as conducting rubber material according to embodiments of the invention.

When the contoured surface is pressed down onto the surface of the sensor touch sensor panel 508, the pliable conductive material may spread out and apply roughly the same amount of pressure across most or the entire surface of the touch sensor panel. The teeth may be located close enough to one another such that when pressure is applied and the teeth spread out, gaps between the teeth are eliminated or minimized. The conducting surface can be connected to ground at the time of calibration.

Figures 6, 7:
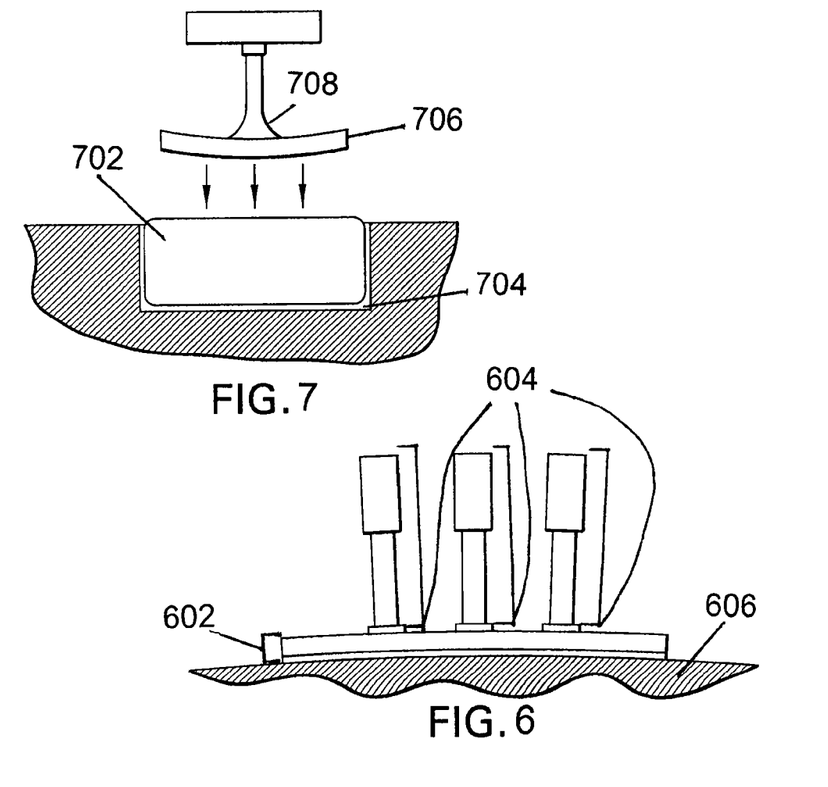
FIG. 6 illustrates an exemplary configuration for applying the conducting member to a touch sensor panel according to embodiments of the invention.
FIG. 7 illustrates an exemplary configuration of a fluid filled flexible container configured to be used as a touch-simulating apparatus according to embodiments of the invention.

FIG. 6 illustrates an exemplary configuration for applying a conducting member to a touch sensor panel according to embodiments of the invention. In FIG. 6 the conducting member 602 is applied using one or more hydraulic contact points 604. By using multiple pressure points, an approximately equal amount of pressure can be applied across the array 606.

FIG. 7 illustrates an exemplary configuration of a flexible container configured to be used to apply uniform touch events to a touch sensor panel according to embodiments of the invention. In FIG. 7, a flexible container 702, such as a fluid filled polymer bag, is located in a well 704 and connected to ground. In other embodiments, the flexible container may be filled with conductive material other than fluid that is capable of easily conforming to most surfaces, such as conductive gels, beads, and the like. A curved sensor or non-linear touch sensor panel 706 attached, for example, by a suction device 708 is then brought down onto the container. The suction device may also provide electrical connections for operating the touch sensor panel, or in other embodiments, one or more separate connectors may provide the electrical connections for operating the touch sensor panel. The touch events provided by the flexible container on the touch sensor panel can then be measured.

The flexible container can provide substantially even touch events across a variety of touch sensor panel surfaces, including non-flat curved surfaces as well as substantially flat surfaces. The configuration of FIG. 7 can contour to the shape of a variety of different surfaces. The container may be configured to be larger than the touch sensor panel being tested. Since the flexible container can adjust to the position and shape of the touch sensor panel, the importance of precisely aligning the flexible container to the touch sensor panel is decreased.

The flexible container can, in some embodiments, be filled with a variety of conducting fluids. Saturated sodium chloride salt water (NaCl) with a conductor attached to ground may be used. In addition to NaCl, a variety of other conducting liquids or gels may be used. For example, KCl, or highly conductive paints with copper, nickel, or silver may be used in addition to conducting gels. These may be more viscous than salt water. Conductive particles such as beads, pellets and the like may also be used. In some embodiments, the conducting liquid, gel or particle may have a conductivity of equal to or greater than 0.005 siemens per meter (S/m), 0.05 S/m, or 5 S/m.

The surface of the flexible container is meant to simulate a finger contact with the touch sensor panel. A variety of flexible containers may be used to simulate the finger contacts. The containers may be very flexible and non-conducting—e.g. latex, rubber. The wall thickness of the container may be made thin to minimize the effect of the container on the calibration device. This is because the container itself is an additional dielectric in the calibration setup.

The container may be calibrated out—that is, the full scale target (i.e. the full range of touch output values) when touch events are generated with a bag of liquid, gel or particles may need to be slightly lower than the full scale target when the touch events are generated with a piece of metal or a highly conductive foam so that the resulting full scale signal when touched with a finger is the same.

The ground electrode in contact with the liquid, gel, particles or other conductive and easily conformable material is preferably chosen to have a long life when placed in contact with the chosen conducting liquid, gel, particles, or the like, without corroding. For example, the ground electrode may include copper with an aluminum sacrificial electrode, or titanium, platinum, or stainless steel.

The container may be located in a well or otherwise surrounded to prevent the fluid, gel, or particles from escaping the testing area and damaging other components if the container ruptures.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A method for calibrating a touch sensor panel having a plurality of sensors, the method comprising:
    simultaneously simulating touch events on every sensor of the touch sensor panel by removably contacting the touch sensor panel with a flexible container containing a conductive and conformable material, wherein the touch events are simultaneously simulated on every sensor of the touch sensor panel by the flexible container;
    obtaining touch output values for the sensors in the touch sensor panel; and
    calibrating the touch sensor panel utilizing the touch output values.

2. The method of claim 1, wherein the conductive and conformable material comprises sodium chloride or potassium chloride.

3. The method of claim 1, wherein the conductive and conformable material has a conductivity of equal to or greater than 5 S/m.

4. The method of claim 1, wherein the flexible container is located in a well configured to contain the conductive and conformable material if the flexible container ruptures.

5. The method of claim 1, wherein the touch sensor panel is a multi-touch sensor panel.

6. The method of claim 1, wherein the container comprises latex rubber.

7. The method of claim 1, wherein the touch sensor panel is connected to a suction device.

8. The method of claim 1, wherein the touch sensor panel is curved.

9. Calibration device for a touch sensor panel having a plurality of sensors, the device comprising:
    a flexible container containing a conductive and conformable material, wherein the flexible container is configured to simultaneously simulate touch events on every sensor of the touch sensor panel by removably contacting the touch sensor panel with the flexible container during calibration; and
    a processing device configured to receive touch output values from the touch sensor panel.

10. The device of claim 9, wherein the conductive and conformable material comprises sodium chloride or potassium chloride.

11. The device of claim 9, wherein the conductive and conformable material has a conductivity of equal to or greater than 5 S/m.

12. The device of claim 9, further comprising a well configured to contain the conductive and conformable material if the flexible container ruptures.

13. The device of claim 9, wherein the touch sensor panel is a multi-touch sensor panel.

14. The device of claim 9, wherein the container comprises latex rubber.

15. The device of claim 9, wherein the touch sensor panel holder comprises a suction device.

16. The device of claim 9, wherein the touch sensor panel is curved.

17. A method for calibrating a touch sensor panel having a plurality of sensors, the method comprising:
   simultaneously simulating touch events on every sensor of the touch sensor panel by removably contacting the touch sensor panel with a contoured surface formed from a pliable conductive material, wherein the touch events are simultaneously simulated on every sensor of the touch sensor panel by the contoured surface;
   providing a plurality of sensor readings for the touch sensor panel; and
   calibrating the sensor panel utilizing the readings.

18. The method of claim 17, wherein the touch sensor panel is a multi-touch sensor panel.

19. The method of claim 17, wherein the pliable conductive material comprises conductive rubber.

20. The method of claim 17, wherein the touch sensor panel is curved.

21. The method of claim 17, wherein the pliable conductive material is formed in a spiral pattern.

22. The method of claim 17, wherein the pliable conductive material comprises a plurality of protrusions.

23. A calibration device for a touch sensor panel having a plurality of sensors, the device comprising:
   a contoured surface comprising a pliable conductive material, wherein the contoured surface is configured to simultaneously simulate touch events on every sensor of the touch sensor panel by removably contacting the touch sensor panel with the contoured surface; and
   a processing device configured to receive signals from the touch sensor panel.

24. The device of claim 23, wherein the touch sensor panel is a multi-touch sensor panel.

25. The device of claim 23, wherein the pliable conductive material comprises conductive rubber.

26. The device of claim 23, wherein the touch sensor panel is curved.

27. The device of claim 23, wherein the pliable conductive material is formed in a spiral pattern.

28. The device of claim 23, wherein the pliable conductive material comprises a plurality of protrusions.

29. The device of claim 23, wherein the contoured surface is connected to a plurality of hydraulic devices.

\* \* \* \* \*

UNITED STATES PATENT AND TRADEMARK OFFICE
CERTIFICATE OF CORRECTION

| | | |
|---|---|---|
| PATENT NO. | : 8,514,203 B2 | Page 1 of 1 |
| APPLICATION NO. | : 12/239630 | |
| DATED | : August 20, 2013 | |
| INVENTOR(S) | : Kenneth Lawrence Staton et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 741 days.

Signed and Sealed this
Tenth Day of February, 2015

Michelle K. Lee
*Deputy Director of the United States Patent and Trademark Office*